(12) United States Patent
Cichoracki

(10) Patent No.: US 10,843,087 B1
(45) Date of Patent: Nov. 24, 2020

(54) TABLE TOP GAME INTEGRATION

(71) Applicant: Dan Cichoracki, Berkley, MI (US)

(72) Inventor: Dan Cichoracki, Berkley, MI (US)

( * ) Notice: Subject to any disclaimer, the term of this patent is extended or adjusted under 35 U.S.C. 154(b) by 291 days.

(21) Appl. No.: 15/689,490

(22) Filed: Aug. 29, 2017

Related U.S. Application Data

(60) Provisional application No. 62/380,759, filed on Aug. 29, 2016.

(51) Int. Cl.
| | | |
|---|---|---|
| *A63B 69/36* | (2006.01) | |
| *A63F 13/825* | (2014.01) | |
| *A63F 13/822* | (2014.01) | |
| *A63F 13/843* | (2014.01) | |
| *A63F 13/847* | (2014.01) | |
| *A63F 13/795* | (2014.01) | |

(52) U.S. Cl.
CPC .......... *A63F 13/825* (2014.09); *A63F 13/795* (2014.09); *A63F 13/822* (2014.09); *A63F 13/843* (2014.09); *A63F 13/847* (2014.09)

(58) Field of Classification Search
CPC .... A63F 13/825; A63F 13/795; A63F 13/847; A63F 13/822; A63F 13/843
See application file for complete search history.

(56) References Cited

U.S. PATENT DOCUMENTS

| | | | |
|---|---|---|---|
| 8,790,186 B1* | 7/2014 | Dethloff | A63F 13/332 463/42 |
| 9,039,533 B2 | 5/2015 | Barney et al. | |
| 9,288,242 B2 | 3/2016 | Van Wie et al. | |
| 2008/0065879 A1* | 3/2008 | Song | G06Q 20/367 713/155 |
| 2009/0051114 A1 | 2/2009 | Robbers et al. | |
| 2009/0227374 A1 | 9/2009 | Tirpak et al. | |
| 2010/0069148 A1 | 3/2010 | Cargill | |
| 2012/0190453 A1 | 7/2012 | Skaff et al. | |

(Continued)

OTHER PUBLICATIONS

A.D. Cheok, "Human Pacman: A Mobile Augmented Reality Entertainment System Based on Physical, Social, and Ubiquitous Computing," Art and Technology of Entertainment Computing and Communication, 2010, pp. 19-22, DOI 10.1007/978-1-84996-137-0_2, Springer-Verlag London Limited.

*Primary Examiner* — Kang Hu
*Assistant Examiner* — Thomas H Henry
(74) *Attorney, Agent, or Firm* — Dinsmore & Shohl LLP

(57) ABSTRACT

Systems, methods, and media for integration of table-top role-playing gaming and online role-playing gaming experiences are provided. A method includes receiving authentication input from each of a first player, a second player, and a host. The method may further receive table input from the first player corresponding to physical in-game interactions of the first player. The method may also receive table input from the second player corresponding to physical in-game interactions of the second player. The method may further still receive table input from the host corresponding to physical in-game interactions of the host. The method may also receive electronic input from the first player corresponding to electronic in-game interactions of the first player. The method may output the table inputs and the electronic input to a device. The method may also subsequently receive, from the device, output that reconciles the table inputs and the electronic input.

19 Claims, 14 Drawing Sheets

(56) References Cited

U.S. PATENT DOCUMENTS

2013/0346151 A1* 12/2013 Bleakley .............. G06Q 10/063
　　　　　　　　　　　　　　　　　　　　705/7.31
2014/0115059 A1* 4/2014 Van Wie ................. H04W 4/21
　　　　　　　　　　　　　　　　　　　　709/204

* cited by examiner

TABLE TOP GAME INTEGRATION

CROSS-REFERENCE TO RELATED APPLICATIONS

This application claims the benefit of U.S. Provisional Application 62/380,759, filed Aug. 29, 2016, which is incorporated by reference in its entirety.

TECHNICAL FIELD

The present application generally relates to table top games and electronic games, such as a table-top role-playing game (TRPG) and/or an online role-playing game (ORPG).

BACKGROUND

Players have traditionally enjoyed the TRPG experience by gathering with friends in a location to play together. One limitation of this approach has been the lack of convenience in getting all the players together in the same location at the same time. More recently, electronic role playing games, such as in ORPGs, have allowed players to take their gaming experience everywhere and play with other players located anywhere in the world. However, TRPG and ORPG experiences have remained separate, such that outcomes from one experience do not carry over into the other type of experience.

Accordingly, a need exists for systems that integrate the TRPG playing experience with the ORPG playing experience, along with media and methods of use of such systems.

SUMMARY

A computer-implemented method for integration of table-top role-playing gaming and online role-playing gaming experiences may comprise receiving authentication input from each of a first player, a second player, and a host. The method may further comprise receiving table input from the first player corresponding to physical in-game interactions of the first player. The method may also comprise receiving table input from the second player corresponding to physical in-game interactions of the second player. The method may further still comprise receiving table input from the host corresponding to physical in-game interactions of the host. The method may additionally comprise receiving electronic input from the first player corresponding to electronic in-game interactions of the first player. The method may additionally further comprise outputting the table inputs and the electronic input to a device. The method may further still comprise subsequently receiving, from the device, output that reconciles the table inputs and the electronic input. The method may also comprise subsequently outputting updated host data, updated first player data, and updated second player data, wherein each of the updated host data, updated first player data, and updated second player data is different.

In another embodiment, a system may comprise memory and a processor coupled to the memory, the processor being configured to receive authentication input from each of a first player, a second player, and a host. The system may be further configured to receive table input from the first player corresponding to physical in-game interactions of the first player. The system may also be further still configured to receive table input from the second player corresponding to physical in-game interactions of the second player. The system may be further still configured to receive table input from the host corresponding to physical in-game interactions of the host. The system may be additionally configured to receive electronic input from the first player corresponding to electronic in-game interactions of the first player. The system may also be configured to output the table inputs and the electronic input to a device. The system may be further configured to subsequently receive, from the device, output that reconciles the table inputs and the electronic input. The system may be still further configured to subsequently output updated host data, updated first player data, and updated second player data, wherein each of the updated host data, updated first player data, and updated second player data is different.

In yet another embodiment, a non-transitory computer readable medium embodies computer-executable instructions, that when executed by a processor, cause the processor to execute operations for integration of table-top role-playing gaming and online role-playing gaming experiences comprising receiving authentication input from each of a first player, a second player, and a host. The non-transitory computer readable medium may also comprise instructions for receiving table input from the first player corresponding to physical in-game interactions of the first player. The non-transitory computer readable medium may further comprise instructions for receiving table input from the second player corresponding to physical in-game interactions of the second player. The non-transitory computer readable medium may additionally comprise instructions for receiving table input from the host corresponding to physical in-game interactions of the host. The non-transitory computer readable medium may still further comprise instructions for receiving electronic input from the first player corresponding to electronic in-game interactions of the first player. The non-transitory computer readable medium may still also comprise instructions for outputting the table inputs and the electronic input to a device. The non-transitory computer readable medium may still additionally comprise instructions for subsequently receiving, from the device, output that reconciles the table inputs and the electronic input. The non-transitory computer readable medium may also comprise instructions for subsequently outputting updated host data, updated first player data, and updated second player data, wherein each of the updated host data, updated first player data, and updated second player data is different.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to methods, systems, and media for table top game integration. For example, software may provide an ORPG with a means of coordinating activities with a TRPG, in such a manner that a player can earn in-game benefits and rewards, experience points, items, weapons, equipment, etc., in both the ORPG and TRPG, and which may allow these in-game rewards and benefits to be used in either the ORPG or the TRPG, regardless of where it was earned. This may be implemented into either a new game or an existing game in order to pair or link the online and offline games. This may also provide alternative methods for players to gain these rewards through a variety of gameplay options.

Figure 1:
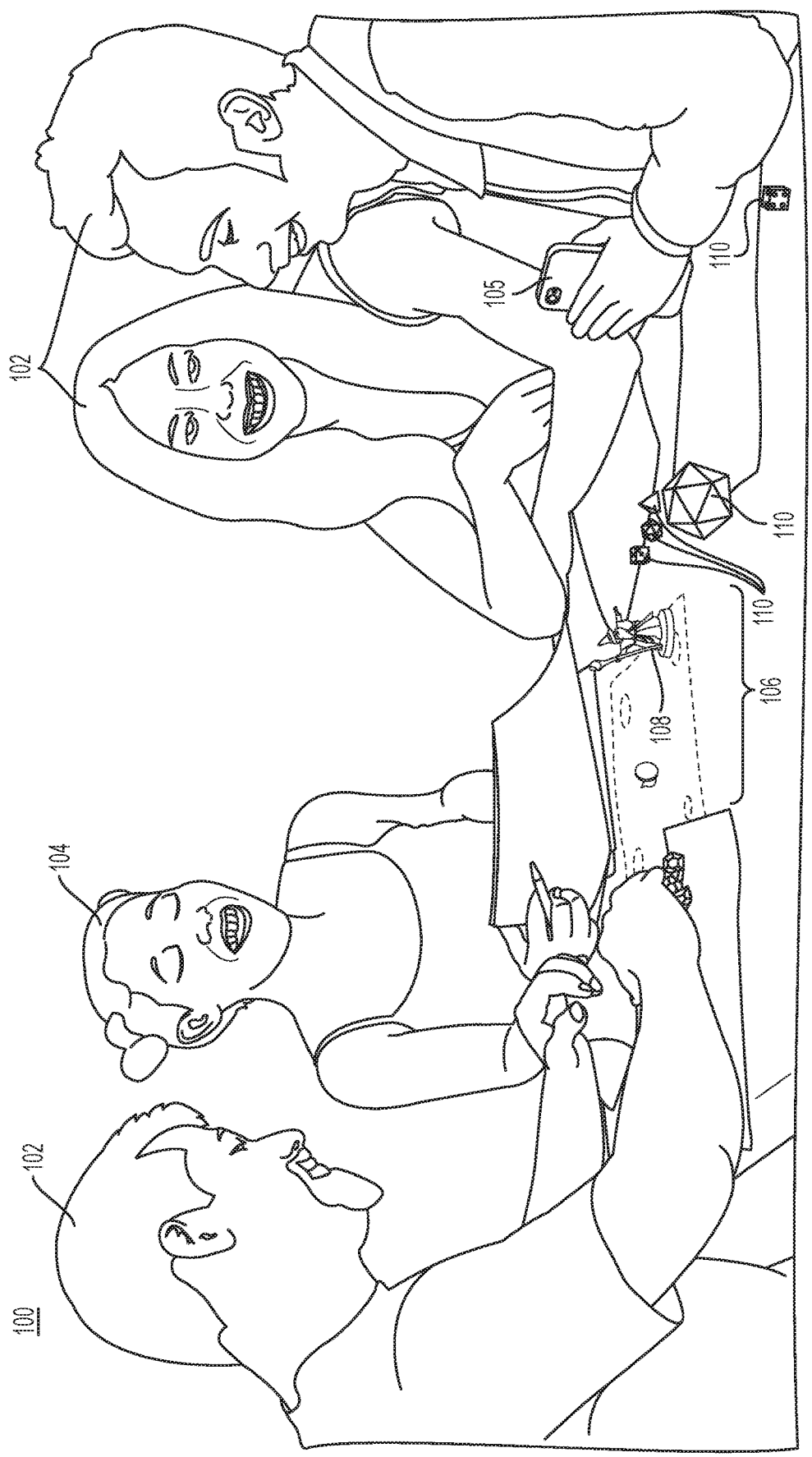
FIG. 1 schematically illustrates an exemplary operating environment featuring a TRPG, according to one or more embodiments shown and described herein.

Referring now to FIG. 1, a diagram 100 of a TRPG is depicted, through which embodiments of the disclosure may be implemented. In this embodiment, a group of table players 102 and a table host 104 participate in a TRPG. Any suitable number of table players 102 and/or table hosts 104 may participate and/or observe in various embodiments. In this embodiment a player 102 participates via a software application 105 (app) on their device, such as a smartphone shown in this embodiment. In various embodiments, any player 102 and/or host 104 may utilize the app 105. Moreover, any player 102 and/or host 104 may utilize the app 105 together within the same game or separately with respect to any other player 102 and/or host 104. In this embodiment, the TRPG 106 may include any suitable number of table playing pieces 108 and/or table number generators 110. In various embodiments, any suitable type of object may be utilized for a table playing piece 108 and any suitable object for randomizing a number may be utilized for table number generators 110, such as dice, etc. Table players 102 and/or table hosts 104 may utilize any suitable type of electronics such as computers, laptops, smartphones, tablets, wearable devices (headsets, glasses, earphones, gloves, etc.). A TRPG 106, table playing pieces 108, and/or table number generators 110 may utilize any suitable type of electronics and/or communication protocols (radio-frequency identification (RFID), GPS, near field communication (NFC), WiFi, etc.). In some embodiments playing pieces may have characteristics and/or attributes that are modified throughout various games. The app 105 may utilize any suitable technology for player 102 and/or host 104 interaction at a TRPG 106, such as augmented reality (including wearable electronics such as headsets, glasses, gloves, motion sensors, biometric scanners/sensors, eye movement detection, hand/arm movement/gestures, etc.), QR code or other scannable codes, biometric authentication or input reception (fingerprint, eye/retinal scanning, motion signature, voice authentication, facial recognition, etc.), wireless communication protocols (radio-frequency identification (RFID), GPS, near field communication (NFC), WiFi, etc.), and/or geographic identification (geotagging/geofencing of player/host electronics, playing pieces 108, table number generators 110, etc.).

Figure 2A:
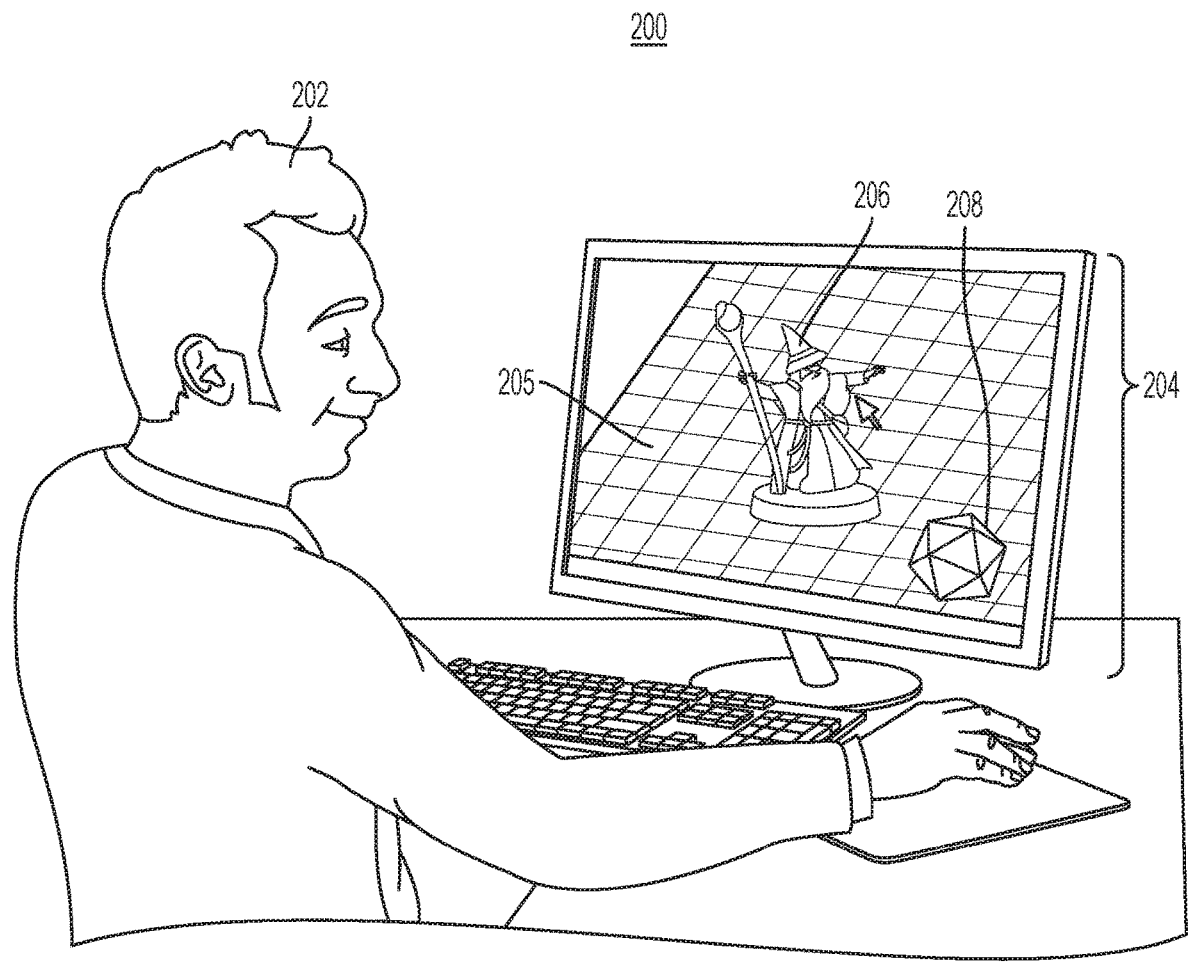
FIG. 2A schematically illustrates exemplary ORPG operating in a computer environment, according to one or more embodiments shown and described herein.

Referring now to FIG. 2A, a diagram 200 of an ORPG 205 on a computer 204 is depicted, through which embodiments of the disclosure may be implemented. In this embodiment, an online player 202 utilizes a computer 204 to participate in an ORPG 205 utilizing a digital playing piece 206 and digital number generator 208. In this embodiment this playing of an ORPG 205 on the computer 204 is separate from the app in 105 of FIG. 1. Any suitable number of online players 202 and/or online hosts may participate and/or observe in various embodiments. One or more screens and/or devices may be shared in some embodiments. In some embodiments, the player 202 may correspond to a table player 102 depicted in FIG. 1, the digital playing piece 206 may correspond to a table playing piece 108 in the TRPG 106 depicted in FIG. 1, the ORPG 205 may correspond to the TRPG 106 in FIG. 1, and/or one or more digital number generators 208 may correspond to the table number generators 110 in FIG. 1. In this embodiment the ORPG operates separately from the TRPG and its corresponding app. In some embodiments attributes and/or characteristics associated with the digital playing piece 206 correspond with one or more table playing pieces 108 as depicted in FIG. 1.

Figure 2B:
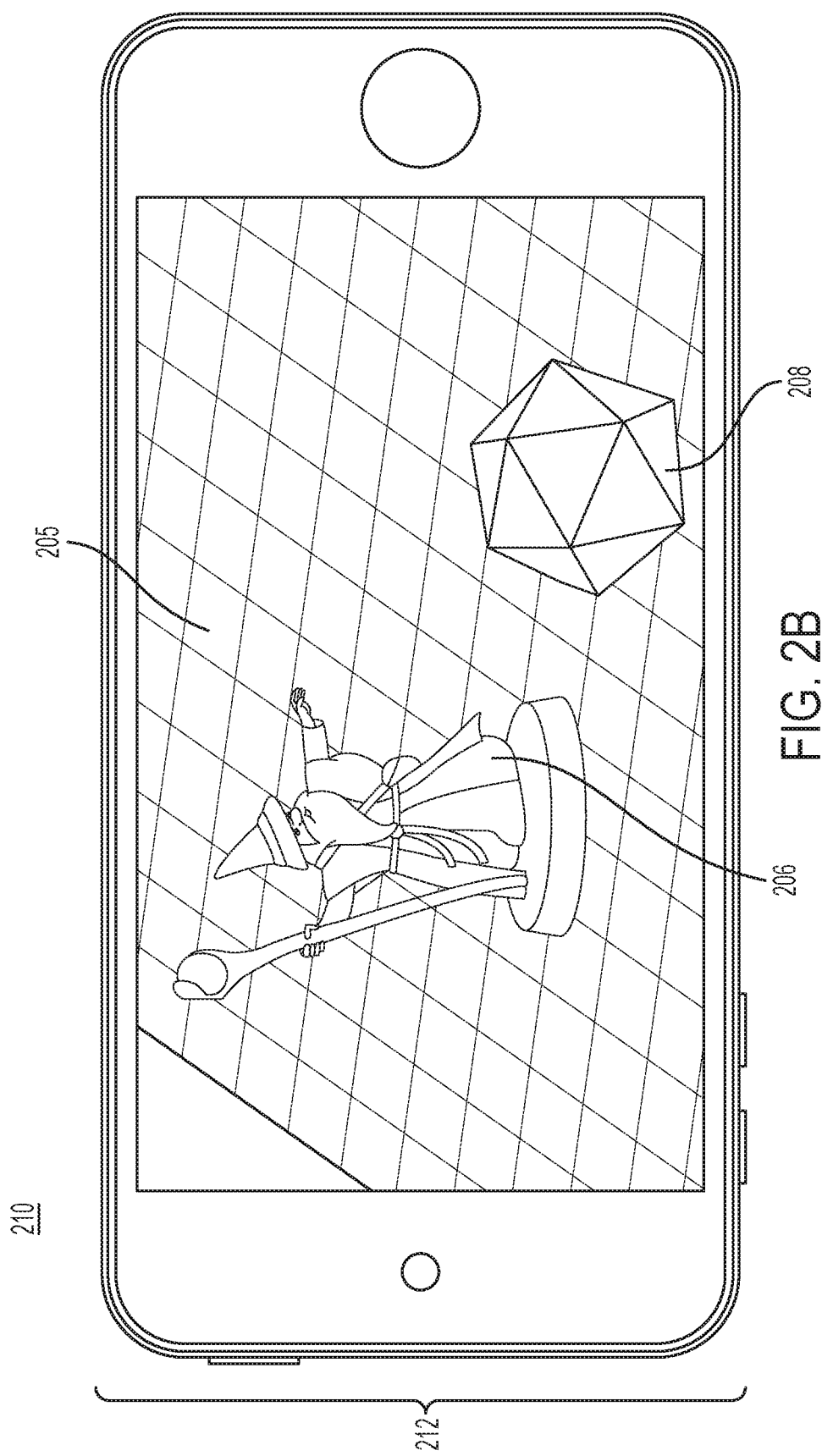
FIG. 2B schematically illustrates an exemplary ORPG operating in a smart phone environment, according to one or more embodiments shown and described herein.

Referring now to FIG. 2B, a diagram 210 of an ORPG 205 on a smartphone 212 is depicted, through which embodiments of the disclosure may be implemented. In this embodiment, the ORPG 205 utilizing a digital playing piece 206 and digital number generator 208 may correspond to those depicted in FIG. 2A and/or the TRPG 106, table playing pieces 108, and/or table number generators 110 depicted in FIG. 1. In other embodiments there not need be such correspondence. In this embodiment this playing of an ORPG 205 on the smartphone 212 is separate from the app in 105 of FIG. 1.

In some embodiments, software (e.g., on a server, on a computer 204, on a smartphone 212 which may be in the form of an application (app), etc.) may provide mechanisms to organize, coordinate, and oversee activities in a TRPG 106 in such a manner that prevents players from cheating, defrauding, or otherwise manipulating play during TRPG activities. Anti-fraud elements may provide players with a level playing field to ensure that each offline game will meet the same requirements for valid game play and create a standard gaming environment before registering any benefits earned during the TRPG 106 on a server. In various embodiments, software may provide the ability to create and join sanctioned coordinated events that allow large numbers of players 102 and/or hosts 104 gathered in a single physical location to play the TRPG 106, simultaneously or in sequence, with additional security measures against fraud, and additional methods to validate games during these sanctioned events. The software may contain functionality to allow players to play a TRPG 106 remotely, such that each player may be able to join a single unique game via a virtual connection method, such as a shared video connection. It may include conversion factors for game-related data and information, such as character attributes and skills, between the whole number, or whole number range format, as needed in an ORPG 205, and the polyhedral die roll format as used in a TRPG 106. The software may display this data and information for reference so that, while playing the TRPG 106, players may have access to their relevant character data. This may work in conjunction with, or as an alternative to, traditional paper data sheets, or character sheets, as are currently in use with TRPGs 106. The software may contain search functionality, allowing users (players, hosts, event coordinators, etc.) to locate nearby or distant players, TRPG 106 games, and/or sanctioned events in order to join events and games and to connect with one or more communities of players. Additionally, available players, games, and/or coordinated events may be advertised or broadcast to communities of players at large, and/or be searchable based on query criteria provided by one or more players, hosts, and/or event coordinators.

Figure 3A:
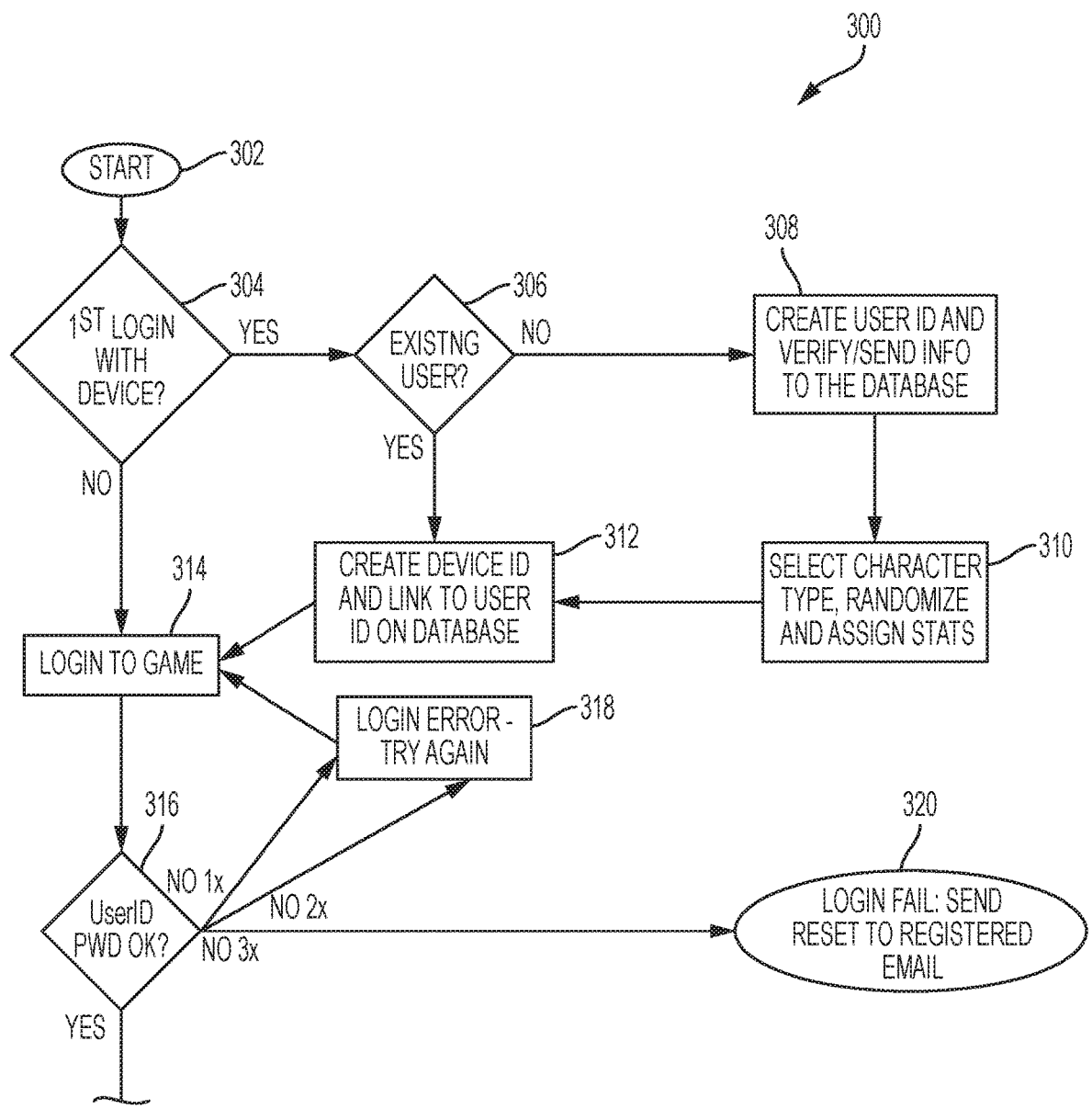
FIG. 3A is a flow chart depicting an exemplary user initialization process, according to one or more embodiments shown and described herein.

Turning now to FIG. 3A, a flowchart 300 of an exemplary user initialization process is shown according to various embodiments. At 302 a software application (or app) may be launched/opened. At 304 a determination may be made as to whether this is a first login attempt with a particular device. If this is a first login attempt with the device, then at 306 a determination may be made as to whether the user of the device is an existing user. Returning to 304, if this is not a first login for the device, the flowchart may proceed to 314. Returning to 306, if the user is not an existing user, then at 308 a user ID may be created (e.g., based on user input, an assigned ID, a suggested ID, etc.), wherein the information may be verified and/or sent to a database and the flowchart may proceed to 310. Otherwise, if the user of the device is an existing user at 306, then the flowchart may proceed to 312. Returning to 310, input may be received from the user selecting a character type and/or character statistics (stats) which may be randomized and/or assigned, and the flowchart may proceed to 312. In other embodiments users may adjust attributes, such as decreasing one attribute to increase another, for example. At 312, a device ID may be created and linked to the user ID (such as in the database, for example), at which point the flowchart may proceed to 314. Returning to 314, a login to a game is undertaken, wherein the flowchart may proceed to 316.

At 316 a determination may be made as to whether a user's ID and/or password (or other suitable authentication such as biometric data, 2-factor authentication using a device such as a smartphone, etc.) are valid. If the user is validated, then the flowchart may proceed to 322 in FIG. 3B. A threshold may be utilized (which may be set by software, established by an administrator, established by a user to be associated with their account) to determine an allowable number of incorrect login attempts that are permissible. In this embodiment, the first two unsuccessful login attempts at 316 may result in proceeding to 318 with a login error notice with a request to try again, at which point the flowchart returns to 314. Continuing with this example, a third unsuccessful login attempt may result in an email being sent to the user's registered email account to reset the password at 320. In some embodiments the user's account may be locked, requiring further authentication and/or approval from a person to unlock the user's account.

Figure 3B:
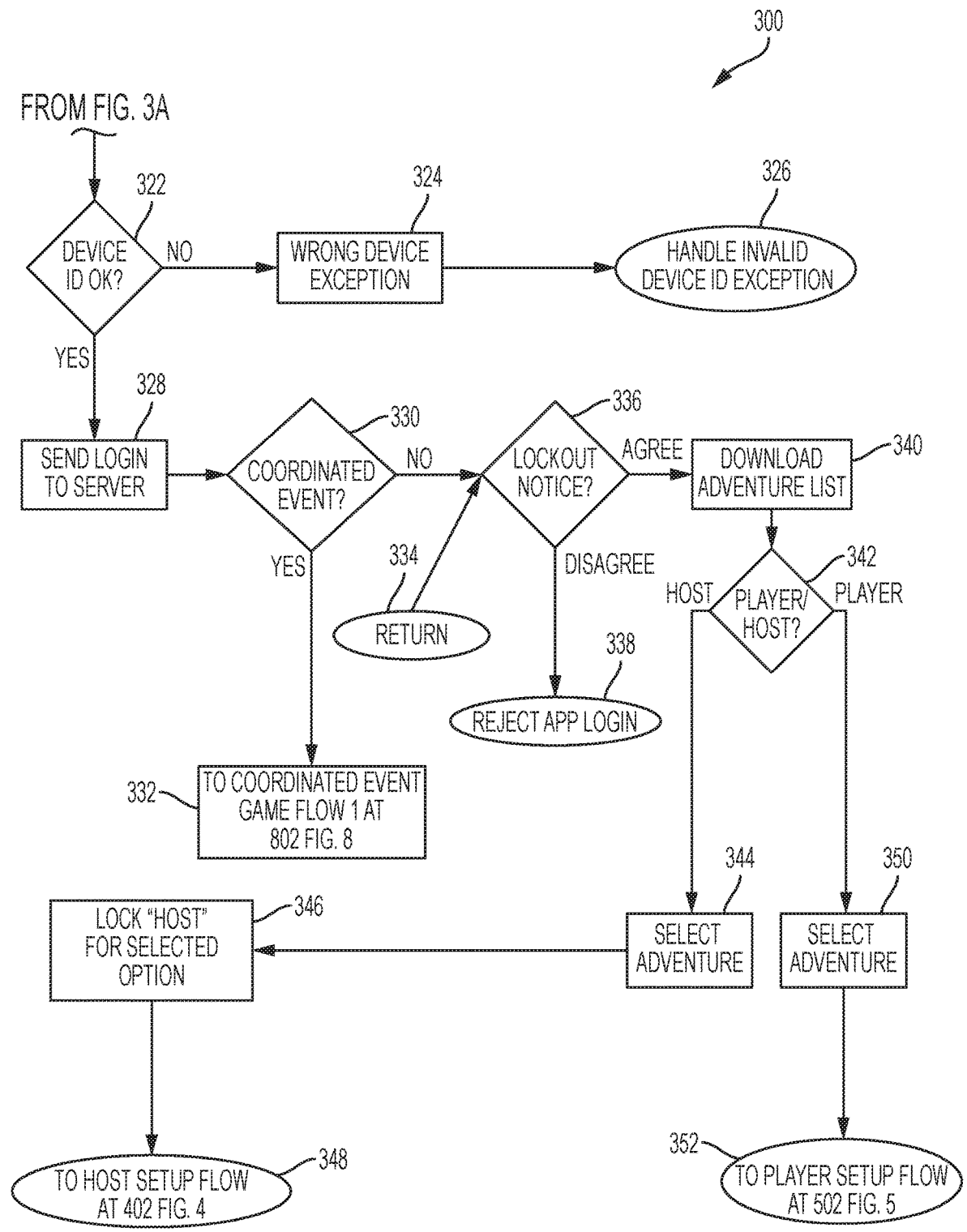
FIG. 3B is a continuation of the flow chart in FIG. 3A depicting an exemplary user initialization process, according to one or more embodiments shown and described herein.

Turning now to FIG. 3B, the flowchart 300 may determine at 322 whether a device ID is valid. If the device ID is not valid, then at 324 a wrong device exception may be given, which may result in an invalid device ID exception at 326. Returning to 322, if the device ID is valid, then at 328 the login is sent to a server (or any other suitable device(s)). Proceeding from 328, if there is a coordinated event at 330, the flowchart may proceed to 332 (to the coordinated game flow 1 at 802 in FIG. 8). Returning to 330, if this is not a coordinated event, then a lockout notice check may be performed at 336. A return point at 334 may correspond to 1014 in FIG. 10 (coordinated event game flow 1), which may proceed to 336. At 336 a lockout notice agreement is provided, wherein the player agrees that by using the app, they will be locked out of playing as their character in the ORPG during the duration of the TRPG while using the app. In this embodiment, this acts a version-control feature so that two versions of the character (TRPG in the app and the ORPG) are not simultaneously doing different things and thereby creating a conflict as to what has happened to the character between the TRGP (via the app) and the ORPG. If at 336 there is disagreement from the player regarding the lockout notice, then the app login may be rejected at 338. If there agreement to the lockout notice from the player at 336, then at 340 an adventure list may be downloaded, and a determination may be made at 342 as to whether the user is a host or player. If the user is a host, then at 344 the user may select one or more adventures available to hosts. The flowchart may then proceed to 346 where the role of host may be locked for any number of selectable and/or selected options. Then at 350 the flowchart may proceed to a host setup flow at 402 in FIG. 4. Returning to 342, if the user is a player, then at 350 the user may select one or more adventures available to players. Then at 352 the flowchart may proceed to a player setup flow at 502 in FIG. 5.

Figure 4:
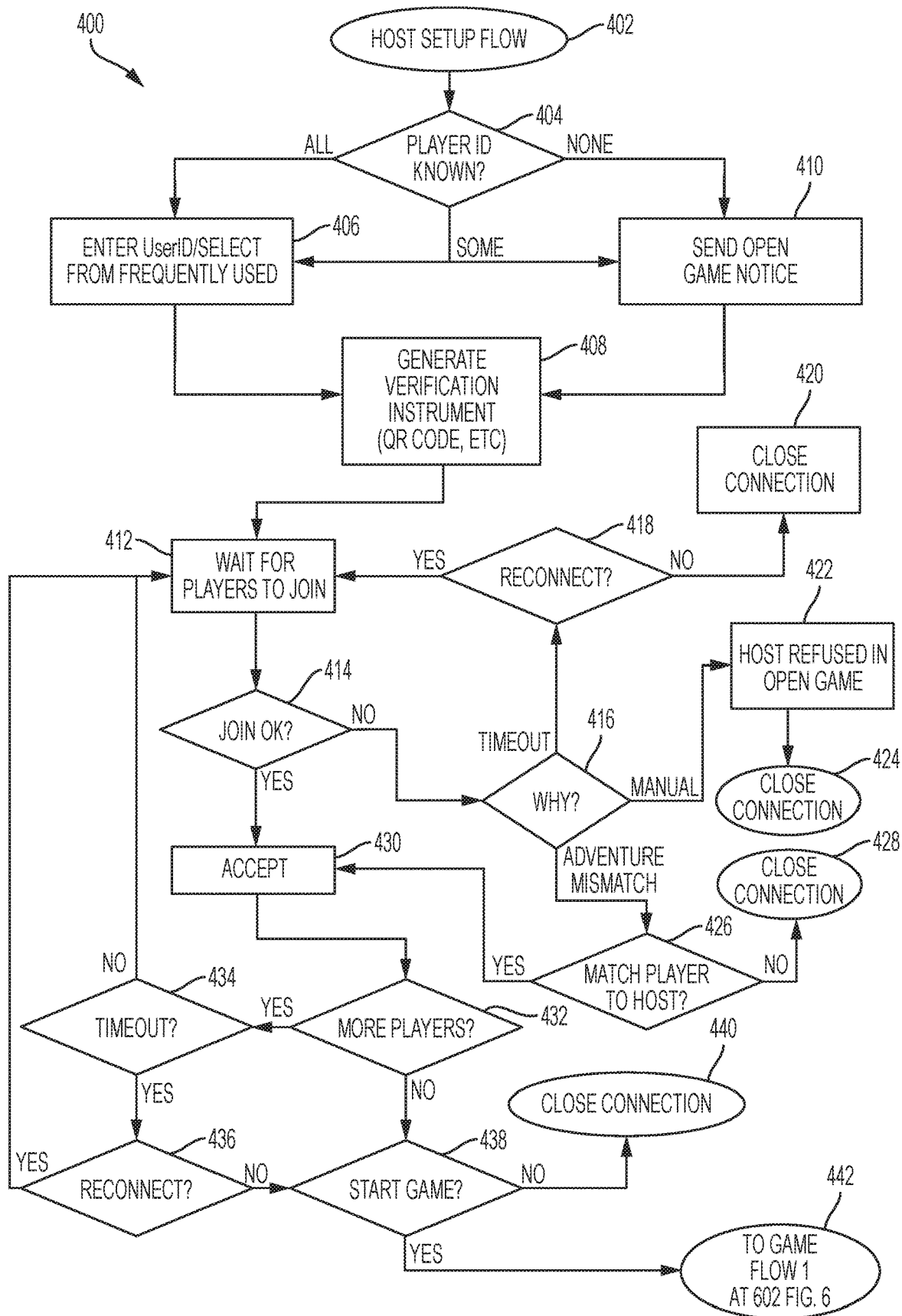
FIG. 4 is a flow chart depicting an exemplary game setup process, according to one or more embodiments shown and described herein.

Turning now to FIG. 4, a flowchart 400 of an exemplary game setup process is shown according to various embodiments. At 402, a host setup flow may be initiated. At 404 if some or all of the IDs (player IDs and/or user IDs) are known, then at 406 the host may enter the ID for those players and/or select from frequently used IDs. The flowchart may then proceed to 408. Returning to 404, for players where the ID is not known, at 410 an open game notice may be sent to such players, where the flowchart may then proceed to 408. At 408 a verification instrument such as a barcode (matrix barcode, QR code, etc.) may be generated and the flowchart may proceed to 412, where there may be a wait for players to join. At 414, a request to join may be received, where a determination may be made as to whether a join request is accepted. If a join request is not accepted, then a determination as to why may be made at 416. If at 416 it is determined that there was a timeout, then the flowchart returns to 418. If at 416 it is determined that the request was manual and the host refused the join request at 422, then the connection for the player may be closed at 424. If at 416 it is determined that there may be an adventure mismatch for the player (such as where the player's character may not be suited for the adventure), then at 426 a determination is made as to whether the player is matched to the host. If there is no match of the player and the host then at 428, the connection for the player may be closed. If there is a match of the player to the host, then the flowchart proceeds to 430. Returning to 414, if the join request is acceptable, then at 430 the join request is accepted. At 432 a determination may be made as to whether there are more players. At 432, if there are more players, the flowchart at 434 makes a determination as to whether there has been a timeout. If there has been a timeout, then the flowchart returns to 412 to wait for players to join. Returning to 434, if there has been a timeout, then at 436 a determination is made as to whether there has been a reconnection. If there has been a reconnection, then the flowchart returns to 412 to wait for players to join. At 436, if there has not been a reconnection, the flowchart proceeds to 438. Returning to 432, if there are no more players, then at 438 the connection is closed if there has not been a game started 440. If at 438 a game has started, then the flowchart proceeds to 442 to game flow 1 at 602 in FIG. 6.

Figure 5:
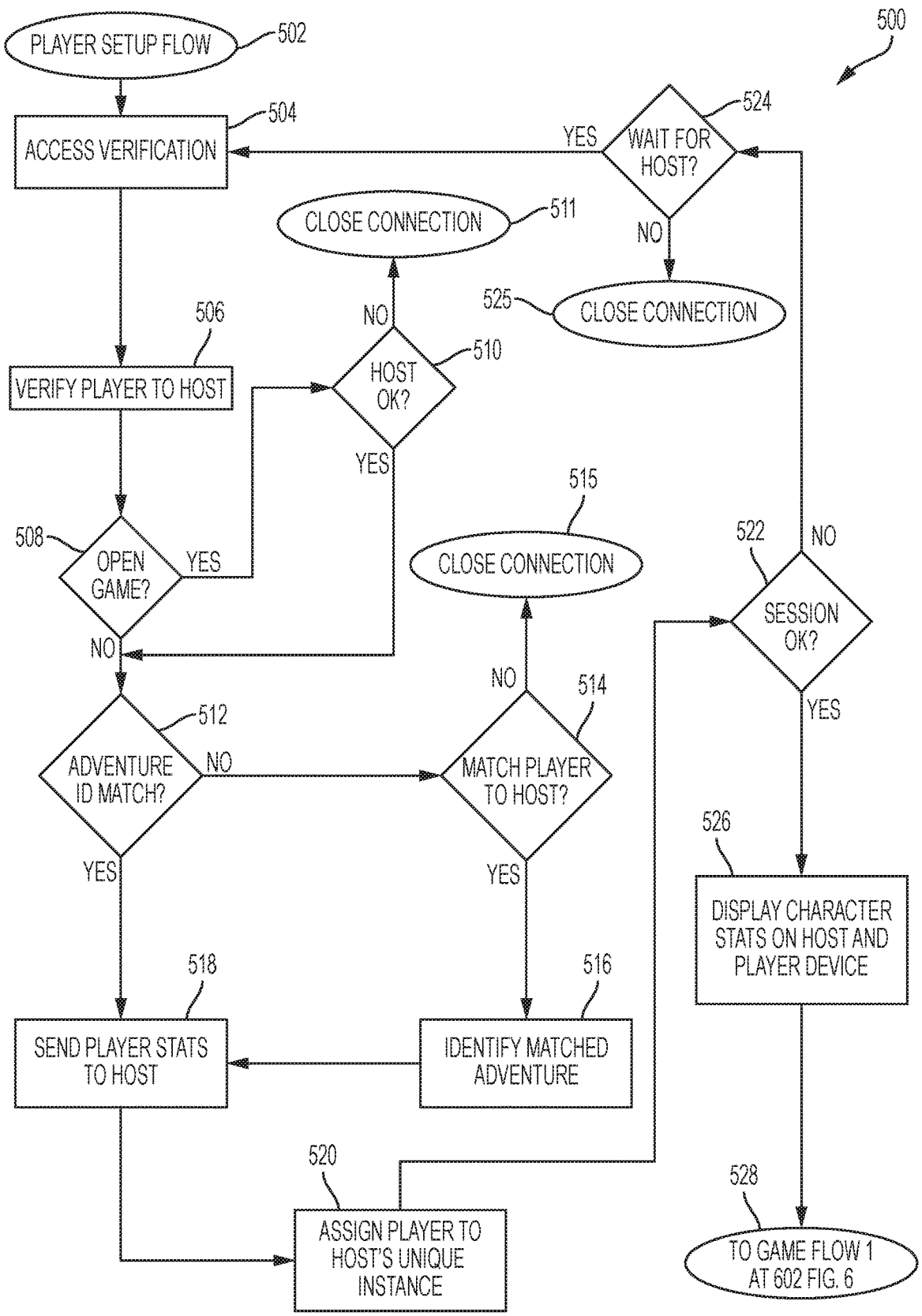
FIG. 5 is a flow chart depicting an exemplary player setup process, according to one or more embodiments shown and described herein.

Turning now to FIG. 5, a flowchart 500 of an exemplary player setup process is shown according to various embodiments. At 502 a player setup flow begins and proceeds to 504 where access verification is performed. In some embodiments, this may include a device or instrument accessible to a smartphone app, such as a camera, which can biometrically identify a user or scan a barcode. Other embodiments may utilize location determination, such as by GPS or WiFi location determination. At 506 a player may be verified to a host by way of any suitable device or instrument. At 508 if a game is an open game, then at 510 a determination is made as to whether the host is ok for the player. At 510 if the host is not ok, then the connection is closed at 511. Returning to 510 if the host is ok, then the flowchart proceeds to 512. Returning to 508, if a game is not an open game, then a determination is made as to whether there is an adventure ID match. If there is not an adventure ID match at 512, then at 514 a determination is made as to whether the player is matched to a host. If at 514 the player is not matched to the host, then the connection may be closed at 515. If at 514 the player is matched to the host, then at 516 a matched adventure is identified, and the flowchart proceeds to 518. Returning to 512, if there is an adventure ID match, then at 518 player stats are sent to the host. At 520, the player is assigned to the host's unique instance. At 522, if the session is not ok, then at 524 a determination is made as to whether to wait for the host. If at 524 there is no waiting for the host, then at 525 the connection is closed. If at 524 the host is being waited upon, then the flowchart returns to 504. Returning to 522, if the session is ok, then at 526 the character stats may be displayed to the host and on the player's device. At 528 the flowchart proceeds to game flow 1 at 602 of FIG. 6.

Figure 6:
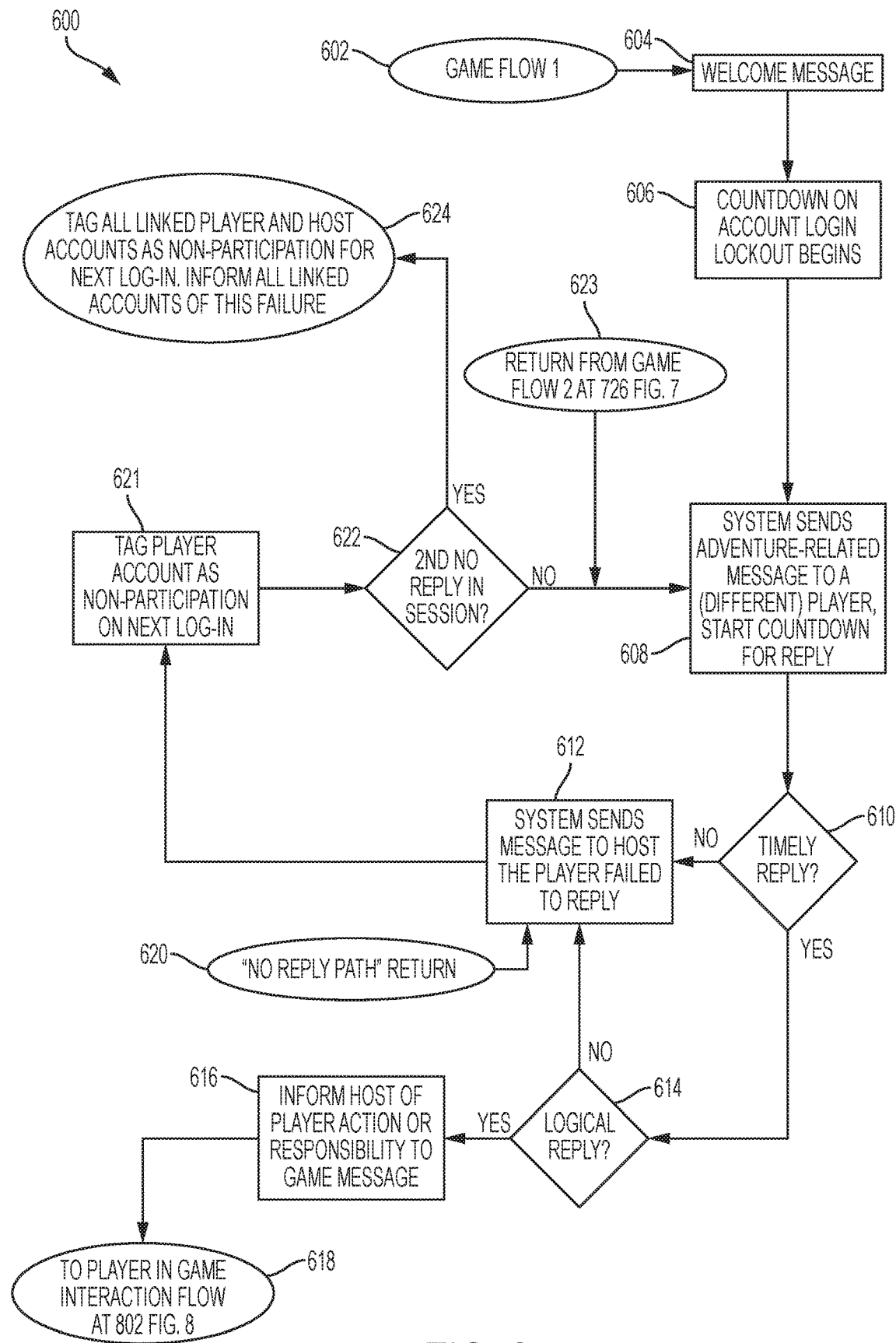
FIG. 6 is a flow chart depicting an exemplary first game flow process, according to one or more embodiments shown and described herein.

Turning now to FIG. 6, a flowchart 600 of an exemplary first game flow process is shown according to various embodiments. At 602, game flow 1 may be initiated. The flowchart may then proceed to 604 where a welcome message may be displayed, such as "Official Start." At 606 a countdown on account login lockout may begin. At 608 an adventure-related message may be sent to a different player and/or start a countdown/timer for a reply. In various embodiments, one or more such messages may be sent to any/all users, which may include the same player and/or one or more hosts. At 610 a determination may be made as to whether there has been a timely reply by the player. If there has not been a timely reply, then at 612 a message may be sent to a host that the player failed to make a timely reply. If there has been a timely reply at 610, then at 614 a determination may be made as to whether the reply is logical. In various embodiments, any suitable type of logical reply may be utilized, such as determining if the reply corresponds to a general category of answer to a question (such as specifying a name, a city, a type of car, etc.) or one or more predetermined correct answers (one or more correct specific names, cities, types of car, etc.). If the reply at 614 is not a logical reply, then the flowchart proceeds to 612. If the reply at 614 is logical, then at 616 the host may be informed of player action and/or of responsibility regarding a game message, which in some embodiments may be a message directed by the host to the particular player or any/all players in the game. At 618 the flowchart may then proceed to 618, which may lead to the player in game interaction flow at 802 of FIG. 8. At 620 a "No Reply Path" return may proceed to 612. Returning to 612, the flowchart may proceed to 621 where the player's account may be tagged/labeled/designated a non-participating upon the next login to the account. In other embodiments, the player's account may be instantly tagged in this way, or based upon any other suitable way, such as a predetermined period of time or delay, or after a certain number of warning messages sent to the player. The flowchart may then proceed to 622, where a determination may be made as to whether this has been the second (or later in other embodiments) no-reply in the session. In various embodiments, a session may be based upon any suitable defining criteria, such as predetermined events, time intervals, etc. If at 622 there has not been a second no-reply, then the flowchart returns to 608. Additionally, at 623, a return from game flow 2 at 726 in FIG. 7 may lead back to 608. Returning to 622, if there has been a second no-reply, then at 624 all linked player and host accounts may be tagged as non-participating for the next login and/or all linked accounts may be informed of this failure. In various embodiments, the session may be invalidated (or rolled-back) such that there may be no gain for characters in the game, such that they may have to start over from the beginning (i.e., where they were at prior to that game) or at some other designated or determined point.

Figure 7:
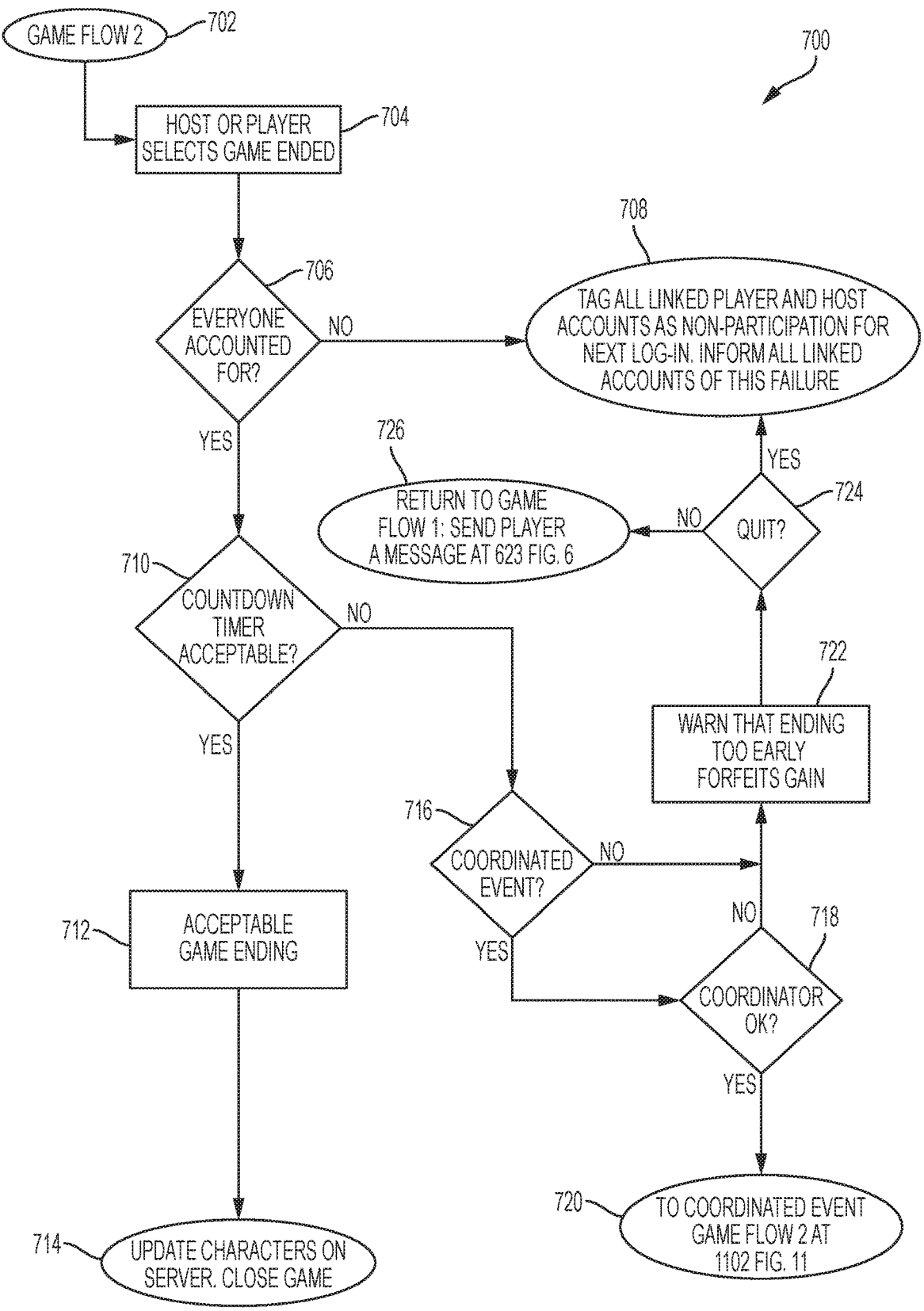
FIG. 7 is a flow chart depicting an exemplary second game flow process, according to one or more embodiments shown and described herein.

Turning now to FIG. 7, a flowchart 700 of an exemplary second game flow process is shown according to various embodiments. At 702, game flow 2 may begin. At 704 a host or player may select an ended game. At 706 a determination may be made as to whether everyone has been accounted for, and if not, then at 708 all linked player and host accounts may be tagged as non-participant (or non-participating) for a subsequent login. Additionally or alternatively, the session may be invalidated along with any changes to characters (such as gains). In some embodiments, the players may have to start over from the beginning of the game or some other designated or determined point. Returning to 706, if everyone has been accounted for, then at 710 a determination may be made as to whether a countdown timer is acceptable (e.g., such as whether an appropriate amount of time has elapsed). If so, then at 712 an acceptable game ending occurs, and at 714 the characters may be updated (such as on the server) and/or the game may be closed. Returning to 710, if the countdown timer does not have an acceptable value, then at 716 a determination may be made as to whether this is a coordinated event. If this is a coordinated event, then at 718 a determination may be made as to whether the event coordinator approves ending the game, and at 720 the flowchart moves to the coordinated event game flow 2 at 1102 of FIG. 11. Returning to 718, if the coordinator does not approve, then at 722 a warning may be generated that ending the game too early (such as at the present time or within a certain amount of time) may forfeit gains to the players, and the flowchart may proceed to 724. Returning to

716, if this is not a coordinated event, then the flowchart proceeds to 722. At 724 a determination may be made as to whether a player quits, and if so, then at 726 the flowchart may return to game flow 1 at 623 of FIG. 6 and may send the player a message.

In some embodiments, this may account for players through the player in-game interaction flow and host through the host in-game occurrence flow. In-app player accounting may not be required in a coordinated event, however host in-game occurrence flow (FIG. 9) may still be required. For example, if there is a 3 hour game, the duration could be reasonably close to 3 hours, if not over, such that no warning for a countdown timer ending. Instead, in this example, the error would be the other way, such as the 3 hour game only lasting 100 minutes. In some examples, players may scan out from a host after a game, which could be similar to a coordinated event. This may be used to put all the players in the same location at the end of the game.

Figure 8:
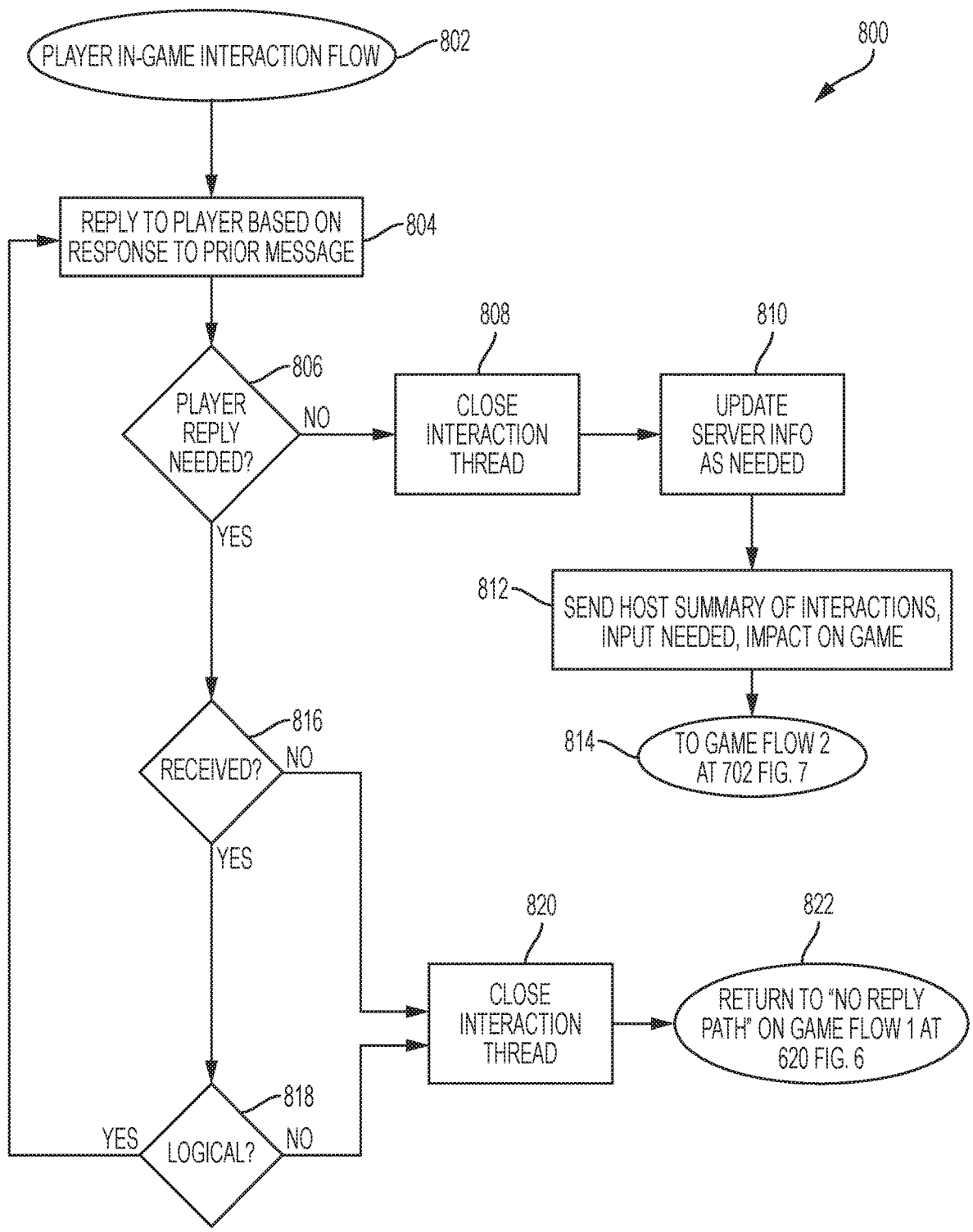
FIG. 8 is a flow chart depicting an exemplary player in-game interaction process, according to one or more embodiments shown and described herein.

Turning now to FIG. 8, a flowchart 800 of an exemplary player in-game interaction process is shown according to various embodiments. At 802, a player in-game interaction flow begins. At 804 a reply is sent to a player based upon a response to a prior message. At 806 a determination may be made as to whether a player reply is needed. If no reply is needed, then at 808 an interaction thread may be closed. The flowchart may then proceed to 810 where info on a server may be updated as needed. At 812 a summary of interactions, inputs needed, and/or impacts upon the game may be sent to the host. At 814 the flowchart may proceed to game flow 2 at 702 of FIG. 7. Returning to 806, if a player reply is needed, than at 816 a determination may be made as to whether the player reply was received. If a player reply was not received at 816, then the flowchart may proceed to 820. If a player reply is received at 816, then a determination as to whether the reply was logical may be made at 818. In various embodiments, any suitable type of logical reply may be utilized, such as determining if the reply corresponds a general category of answer to a question (such as specifying a name, a city, a type of car, etc.) or one or more predetermined correct answers (one or more correct specific names, cities, types of car, etc.). If at 818 the player reply is logical, then the flowchart returns to 804. If the player reply is not logical, then at 820 an interaction thread is closed. At 822 the flowchart may return to the "no reply path" at 620 of FIG. 6.

This process may be repeated throughout a game, whether in set intervals or at random (or pseudo-random) times, which may be with different players but not with the host. If the host is not present, then in some embodiments no players can play the host and cannot be taken away from the game. In some embodiments, the player in-game interaction flow is where most of the verification will occur. In these embodiments, it is creating logical, threaded loops as needed to create user-server interaction, which gives the server something to "see" that verifies user participation.

Figure 9:
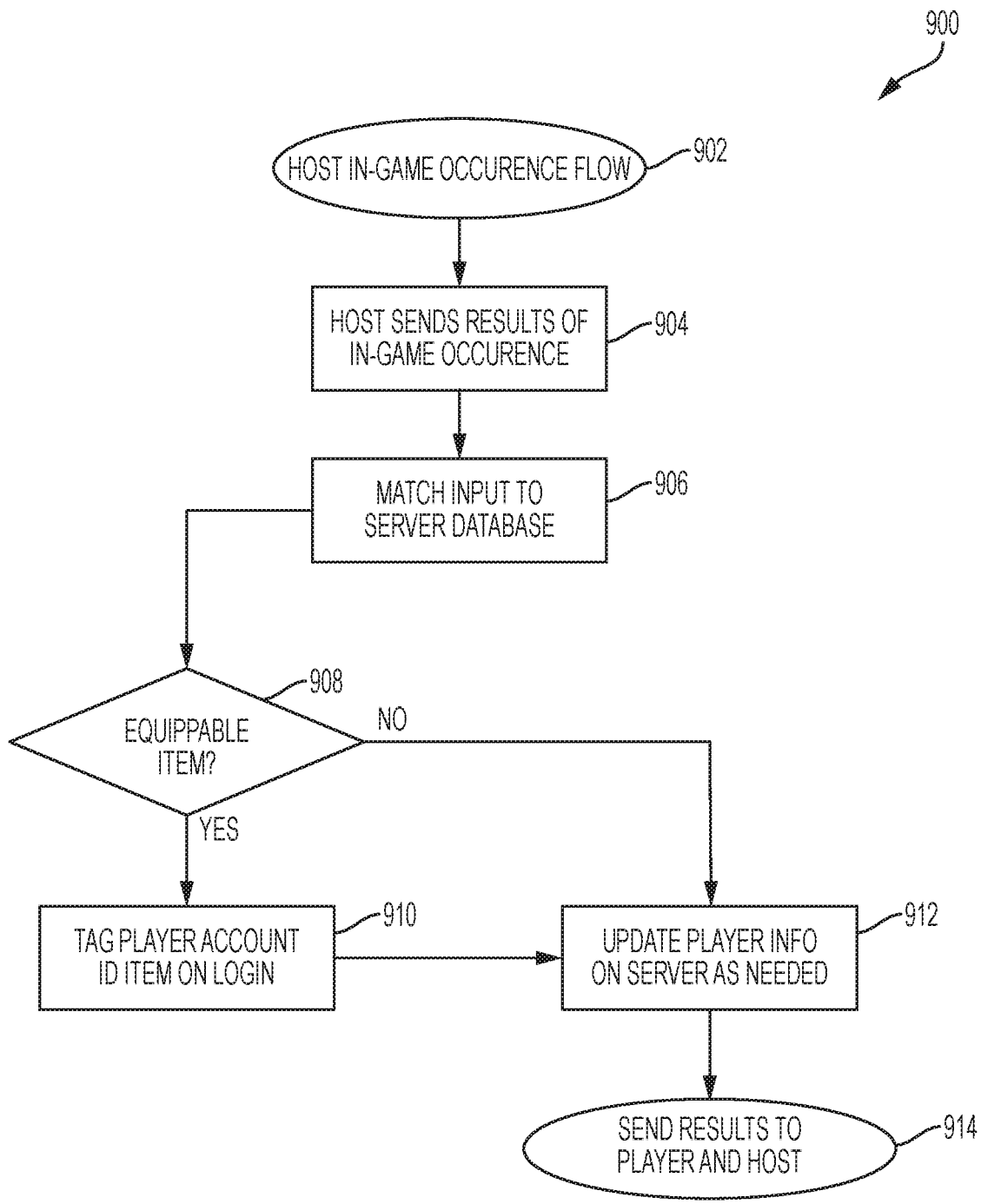
FIG. 9 is a flow chart depicting an exemplary host in-game occurrence process, according to one or more embodiments shown and described herein.

Turning now to FIG. 9, a flowchart 900 of an exemplary game host in-game occurrence process is shown according to various embodiments. At 902, a host in-game occurrence flow may begin. At 904 a host may send results of an in-game occurrence, which may be the results of an entire game, a partial game, or specific game/character events. At 906 the input received from the host may be matched to a database in a server (or any other suitable device). At 908 a determination may be made as to whether an item is an equippable. If an item is not equippable, then the flowchart may proceed to 912. If the item is equippable, then at 910 a player account may be tagged/associated with the item (such as with an ID for the item) upon login of the player. The flowchart may then proceed to 912, where player information may be updated on a server as needed. At 914 results (such as relevant data changes regarding items or events) may be sent to one or more players and/or hosts.

In some embodiments, this may be a free-standing process that may be started only by the host. In embodiments, it may be initiated at any time after a game has started in game flow 1. It may be required at least once per game, and in some embodiments may be performed multiple times. In some embodiments, it may not be started outside of game flow 1 and/or game flow 2.

Figure 10:
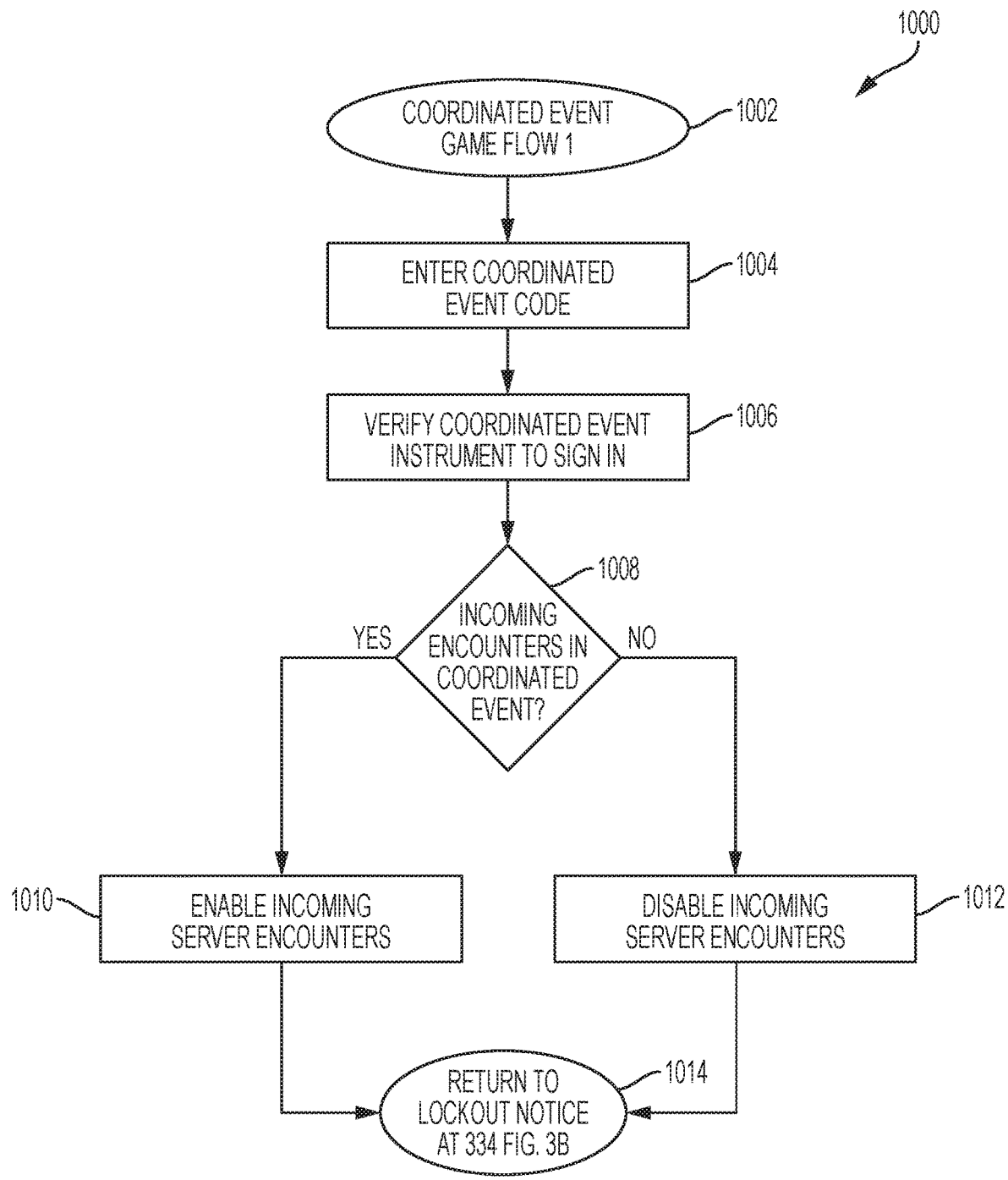
FIG. 10 is a flow chart depicting an exemplary first coordinated event game process, according to one or more embodiments shown and described herein.

Turning now to FIG. 10, a flowchart 1000 of an exemplary first coordinated event game process is shown according to various embodiments. At 1002, a coordinated event flow 1 may begin, with a coordinated event code being entered at 1004. A code may be any suitable type of code, such as a QR code, etc. At 1006 there may be verification of a coordinated event instrument to sign in. In embodiments, the user may have signed into a coordinated event and then indicates whether or not they want to receive incoming server messages. In some embodiments, this is an optional step for verification as a coordinated event may have at least one event coordinator that verifies user participation in person. This may pick up into the launch & login process where the user then agrees to lock all logins to the account from other devices/locations for the duration of this occurrence.

At 1008 a determination may be made as to whether there are incoming encounters in the coordinated event. If so, then at 1010 incoming server encounters may be enabled and the flowchart may proceed to 1014. If at 1008 there are not incoming encounters in the coordinated event, then at 1012 incoming server encounters may be disabled and at 1014 the flowchart may return to a lockout notice. At 1014 the return to a lockout notice may then lead to 334 in FIG. 3B.

Figure 11:
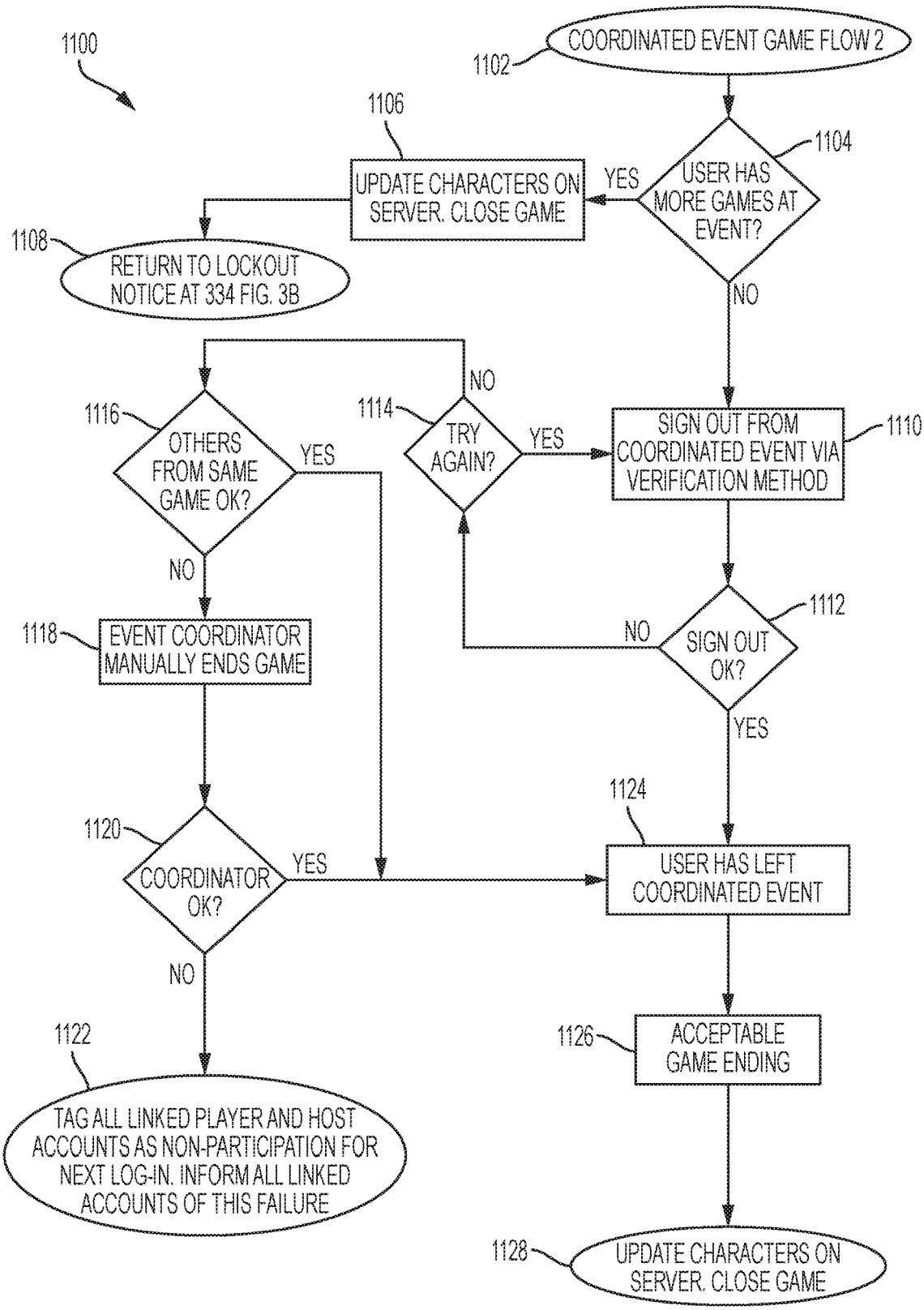
FIG. 11 is a flow chart depicting an exemplary second coordinated event game process, according to one or more embodiments shown and described herein.

Turning now to FIG. 11, a flowchart 1100 of an exemplary second coordinated event game process is shown according to various embodiments. At 1102, a coordinated event game flow 2 may begin. At 1104 a determination may be made as to whether a user has more games at a coordinated event. If so, then at 1106, associated characters may be updated on a server and/or a game (such as a current game in which the player is participating) may be closed. At 1108 the flowchart may return to a lockout notice, which may then lead to 334 in FIG. 3B. Returning to 1104, if a user does not have more games at a coordinated event, then at 1110 a user (or host in some embodiments) may sign out or be signed out from the coordinated event via a verification method (such as username/password, biometric verification, etc.). At 1112 a determination may be made as to whether the sign out was ok. If not, then at 1114 a determination may be made as to whether to try again to sign out. If so, then the flowchart may return to 1110. If not, then at 1116 a determination may be made as to whether other players from the game in an ok state, such as being validly involved in the game or currently signed out of the game. In other embodiments, an ok may be input providing approval or disapproval. If others from the same game are ok at 1116, then the flowchart proceeds to 1124. If others from the same game are not ok at 1116, then at 1118 the event coordinator may manually end the game. At 1120 if the coordinator is ok or provides an ok, then the flowchart moves to 1124. Otherwise, at 1122 all linked players and/or host accounts associated with the coordinated event may be tagged for a subsequent login. In some embodiments, all or some of the linked accounts will be informed of this failure and/or the session will be invalidated such that there is no gain for characters associated with such accounts. In some embodiments, this may mean that the characters have to start over from the beginning of the game or at some other designated point. Returning to 1112, if the sign out was ok, then at 1124 in some embodiments a user has left the coordinated event. At 1126 an acceptable game ending may occur. At 1128 characters (such as from the game and/or the coordinated event) may be updated on a server and/or the game is closed.

Figure 12:
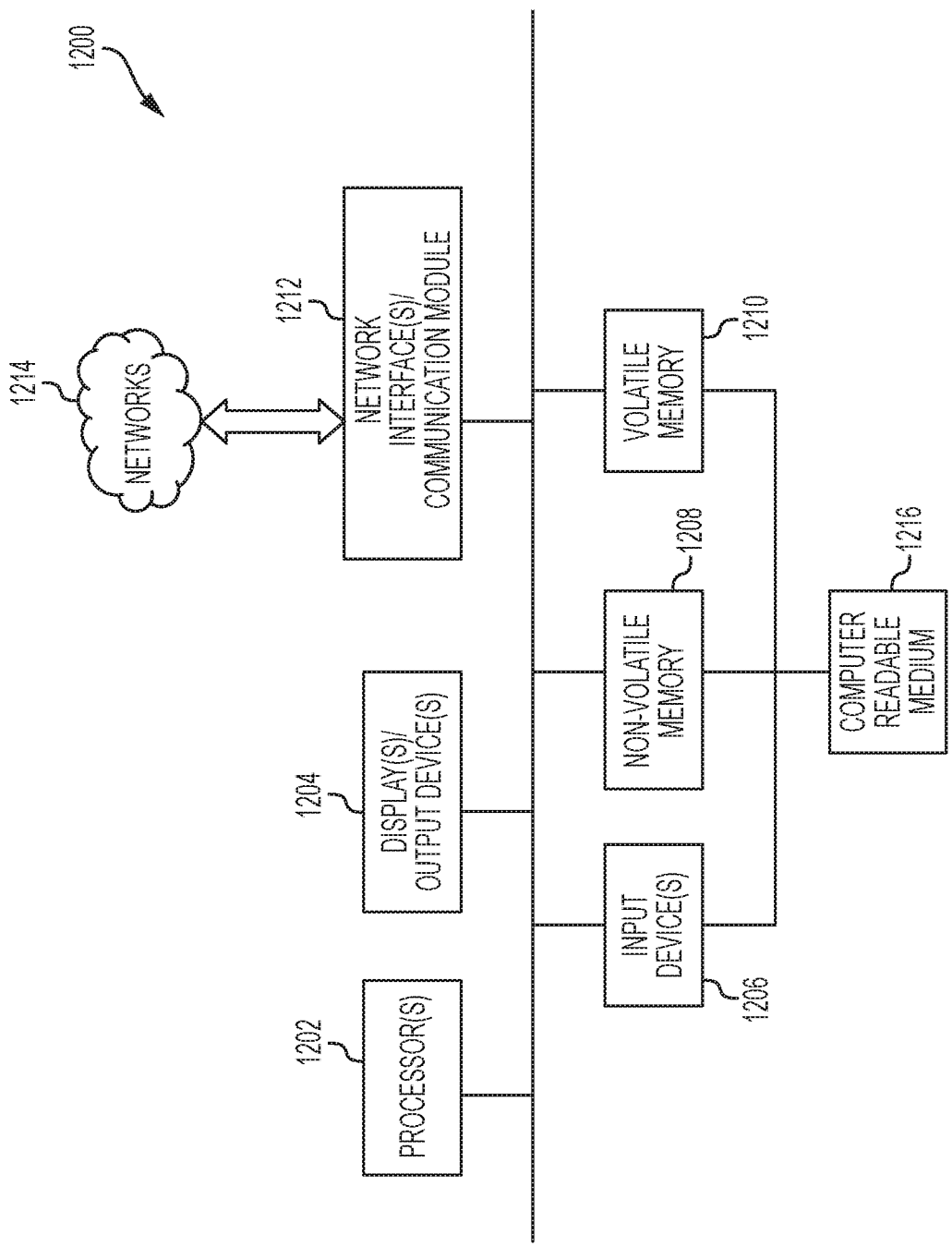
FIG. 12 is a block diagram illustrating computing hardware utilized in one or more devices for implementing various processes, media, and systems, according to one or more embodiments shown and described herein.

Turning now to FIG. 12, a block diagram illustrates an example of a computing device 1200, through which embodiments of the disclosure may be implemented. The computing device 1200 described herein is but one example of a suitable computing device and does not suggest any limitation on the scope of any embodiments presented. Nothing illustrated or described with respect to the computing device 1200 should be interpreted as being required or as creating any type of dependency with respect to any element or plurality of elements. In various embodiments, a computing device 1200 may include, but need not be limited to, a desktop, laptop, server, client, tablet, smartphone, or any other type of device that may store, utilize, and/or transmit data. In an embodiment, the computing device 1200 includes at least one processor 1202 and memory (non-volatile memory 1208 and/or volatile memory 1210). The computing device 1200 may include one or more displays and/or output devices 1204 such as monitors, speakers, headphones, projectors, wearable-displays, holographic displays, and/or printers, for example. The computing device 1200 may further include one or more input devices 1206 which may include, by way of example, any type of mouse, keyboard, disk/media drive, memory stick/thumb-drive, memory card, pen, touch-input device, biometric scanner, voice/auditory input device, motion-detector, camera, scale, etc.

The computing device 1200 may include non-volatile memory 1208 (ROM, flash memory, etc.), volatile memory 1210 (RAM, etc.), or a combination thereof. A network interface 1212 may facilitate communications over a network 1214 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 1212 may be communicatively coupled to any device capable of transmitting and/or receiving data via the network 1214. Accordingly, the hardware of the network interface 1212 may include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 1216 may comprise a plurality of computer readable mediums, each of which may be either a computer readable storage medium or a computer readable signal medium. A computer readable storage medium 1216 may reside, for example, within an input device 1206, non-volatile memory 1208, volatile memory 1210, or any combination thereof. A computer readable storage medium may include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium may include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 1200 may include one or more network interfaces 1212 to facilitate communication with one or more remote devices, which may include, for example, client and/or server devices. A network interface 1212 may also be described as a communications module, as these terms may be used interchangeably.

Additional features may include a coordinated event having an event coordinator and a plurality of games, hosts, and players. Another feature may include receiving input from the event coordinator specifying an event date, an event time, an event duration, a maximum number of games, a maximum number of players per game or event, and whether the coordinated event is searchable or non-searchable. Still another feature may include a searchable game and a non-searchable game. Other features may include input specifying, for each of the first player and the second player: a unique user identifier, a unique device identifier, and unique in-game character identifier corresponding to a table version of a character and an electronic version of the character. An additional feature may include comparing inputs from the first player and the second player against a validity condition and, based upon failure of one of compared inputs to satisfy the validity condition, revoking a plurality of previously-recorded events within a table game or electronic game.

In another feature, the validity condition may comprise a request, sent to one of the players, having a time limit and a correct answer, and also a response received from the one of the players, wherein the response is compared to the time limit and the correct answer. In still another feature, input may be received specifying a host or player option, with received input specifying an adventure from a list, received input specifying a game type, output providing a prompt for a quantity of known players to participate, received input specifying the quantity of known players to participate, output providing a prompt for a quantity of total players to participate, received input specifying the quantity of total players to participate, output providing a prompt for a start date and time, received input specifying the start date and time, and output providing an open table notification. In yet another feature, a listing of available games may be output. In still another feature, input may be received from a third player specifying availability to join a game along with outputting of the input received from the third player.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer-implemented method for integration of table-top role-playing gaming and online role-playing gaming experiences, comprising:
    preparing a coordinated event having an event coordinator and a plurality of games, wherein each game has a host and a plurality of players, wherein accounts of the hosts and players each are linked to the coordinated event;
    associating a different device identifier with a user account for each of the hosts and players;
    receiving authentication input from each of a first player, a second player, and a host;
    receiving table input from the first player corresponding to physical in-game interactions of the first player;
    receiving table input from the second player corresponding to physical in-game interactions of the second player;
    initiating, within a session, a first decrementing countdown value for a pre-login lockout of an account of the first player;
    receiving input from the first player:
        permitting incoming server messages; and
        locking all logins to their account from other devices and locations for a duration of a table-top role-playing game;
    receiving table input from the host corresponding to physical in-game interactions of the host;
    receiving electronic input from the first player corresponding to electronic in-game interactions of the first player;
    outputting the table inputs and the electronic input to a device;
    subsequently receiving, from the device, output that reconciles the table inputs and the electronic input;
    subsequently outputting updated host data, updated first player data, and updated second player data, wherein each of the updated host data, updated first player data, and updated second player data is different;
    outputting, within the session, a message with a post-login decrementing countdown value for an account of the second player;
    upon expiration of the post-login decrementing countdown value due to a non-reply by the second player within the session, outputting a message to the host that the second player failed to reply;
    tagging the account of the second player for a subsequent login regarding non-participation;
    receiving, within the session, a subsequent non-reply from the second player in response to a subsequent message within the session;
    notifying, regarding the non-participation, all accounts linked to the coordinated event;
    tagging the accounts of the first player and the second player and the host for non-participation for subsequent logins for each respective account, based upon the second non-reply from the second player;
    comparing inputs from the first player and the second player against a validity condition; and
    based upon failure of one of compared inputs to satisfy the validity condition, revoking a plurality of previously-recorded events within a table game or electronic game.

2. The computer-implemented method of claim 1, further comprising receiving input from the event coordinator specifying an event date, an event time, an event duration, a maximum number of games, a maximum number of players per game or event, and whether the coordinated event is searchable or non-searchable.

3. The computer-implemented method of claim 1, further comprising a searchable game and a non-searchable game.

4. The computer-implemented method of claim 1, further comprising input specifying, for each of the first player and the second player: a unique user identifier, a unique device identifier, and unique in-game character identifier corresponding to a table version of a character and an electronic version of the character.

5. The computer-implemented method of claim 1, wherein the validity condition comprises:
    a request, sent to one of the players, having a time limit and a correct answer; and
    a response received from the one of the players, wherein the response is compared to the time limit and the correct answer.

6. The computer-implemented method of claim 1, wherein the second player is participating in a plurality of games at the coordinated event, further comprising closing another game in which the second player is participating at the coordinated event based upon the subsequent non-reply from the second player.

7. A system for integration of table-top role-playing gaming and online role-playing gaming experiences, comprising:
    memory; and
    a processor coupled to the memory, the processor being configured to:

prepare a coordinated event having an event coordinator and a plurality of games, wherein each game has a host and a plurality of players, wherein accounts of the hosts and players each are linked to the coordinated event;
associate a different device identifier with a user account for each of the hosts and players;
receive authentication input from each of a first player, a second player, and a host;
receive table input from the first player corresponding to physical in-game interactions of the first player;
receive table input from the second player corresponding to physical in-game interactions of the second player;
initiate, within a session, a first decrementing countdown value for a pre-login lockout of an account of the first player;
receive input from the first player:
permitting incoming server messages; and
locking all logins to their account from other devices and locations for a duration of a table-top role-playing game;
receive table input from the host corresponding to physical in-game interactions of the host;
receive electronic input from the first player corresponding to electronic in-game interactions of the first player;
output the table inputs and the electronic input to a device;
subsequently receive, from the device, output that reconciles the table inputs and the electronic input;
subsequently output updated host data, updated first player data, and updated second player data, wherein each of the updated host data, updated first player data, and updated second player data is different;
output, within the session, a message with a post-login decrementing countdown value for an account of the second player;
upon expiration of the post-login decrementing countdown value due to a non-reply by the second player within the session, output a message to the host that the second player failed to reply;
tag the account of the second player for a subsequent login regarding non-participation;
receive, within the session, a subsequent non-reply from the second player in response to a subsequent message within the session;
notify, regarding the non-participation, all accounts linked to the coordinated event;
tag the accounts of the first player and the second player and the host for non-participation for subsequent logins for each respective account, based upon the second non-reply from the second player;
compare inputs from the first player and the second player against a validity condition; and
based upon failure of one of compared inputs to satisfy the validity condition, revoke a plurality of previously-recorded events within a table game or electronic game.

8. The system of claim 7 wherein the processor is further configured to receive input from the event coordinator specifying an event date, an event time, an event duration, a maximum number of games, a maximum number of players per game or event, and whether the coordinated event is searchable or non-searchable.

9. The system of claim 7 wherein the processor is further configured to receive input specifying, for each of the first player and the second player: a unique user identifier, a unique device identifier, and unique in-game character identifier corresponding to a table version of a character and an electronic version of the character.

10. The system of claim 7 wherein the processor is further configured to:
receive input specifying a host or player option;
receive input specifying an adventure from a list;
receive input specifying a game type;
output a prompt for a quantity of known players to participate;
receive input specifying the quantity of known players to participate;
output a prompt for a quantity of total players to participate;
receive input specifying the quantity of total players to participate;
output a prompt for a start date and time;
receive input specifying the start date and time; and
output an open table notification.

11. The system of claim 7 wherein the processor is further configured to output a listing of available games.

12. The system of claim 7 wherein the processor is further configured to:
receive input from a third player specifying availability to join a game; and
output the input received from the third player.

13. The system of claim 7, wherein:
the second player is participating in a plurality of games at the coordinated event; and
based upon the subsequent non-reply from the second player, the processor is further configured to close another game in which the second player is participating at the coordinated event.

14. A non-transitory computer readable medium embodying computer-executable instructions, that when executed by a processor, cause the processor to execute operations for integration of table-top role-playing gaming and online role-playing gaming experiences comprising:
preparing a coordinated event having an event coordinator and a plurality of games, wherein each game has a host and a plurality of players, wherein accounts of the hosts and players each are linked to the coordinated event;
associating a different device identifier with a user account for each of the hosts and players;
receiving authentication input from each of a first player, a second player, and a host;
receiving table input from the first player corresponding to physical in-game interactions of the first player;
receiving table input from the second player corresponding to physical in-game interactions of the second player;
initiating, within a session, a first decrementing countdown value for a pre-login lockout of an account of the first player;
receiving input from the first player:
permitting incoming server messages; and
locking all logins to their account from other devices and locations for a duration of a table-top role-playing game;
receiving table input from the host corresponding to physical in-game interactions of the host;
receiving electronic input from the first player corresponding to electronic in-game interactions of the first player;
outputting the table inputs and the electronic input to a device;

subsequently receiving, from the device, output that reconciles the table inputs and the electronic input;
subsequently outputting updated host data, updated first player data, and updated second player data, wherein each of the updated host data, updated first player data, and updated second player data is different;
outputting, within the session, a message with a post-login decrementing countdown value for an account of the second player;
upon expiration of the post-login decrementing countdown value due to a non-reply by the second player within the session, outputting a message to the host that the second player failed to reply;
tagging the account of the second player for a subsequent login regarding non-participation;
receiving, within the session, a subsequent non-reply from the second player in response to a subsequent message within the session;
notifying, regarding the non-participation, all accounts linked to the coordinated event;
tagging the accounts of the first player and the second player and the host for non-participation for subsequent logins for each respective account, based upon the second non-reply from the second player;
comparing inputs from the first player and the second player against a validity condition; and
based upon failure of one of compared inputs to satisfy the validity condition, revoking a plurality of previously-recorded events within a table game or electronic game.

15. The non-transitory computer readable medium of claim 14 further comprising instructions for:
a request, sent to one of the players, having a time limit and a correct answer; and
a response received from the one of the players, wherein the response is compared to the time limit and the correct answer.

16. The non-transitory computer readable medium of claim 14 further comprising instructions for receiving input specifying, for each of the first player and the second player: a unique user identifier, a unique device identifier, and unique in-game character identifier corresponding to a table version of a character and an electronic version of the character.

17. The non-transitory computer readable medium of claim 14 further comprising instructions for:
receiving input specifying a host or player option;
receiving input specifying an adventure from a list;
receiving input specifying a game type;
outputting a prompt for a quantity of known players to participate;
receiving input specifying the quantity of known players to participate;
outputting a prompt for a quantity of total players to participate;
receiving input specifying the quantity of total players to participate;
outputting a prompt for a start date and time;
receiving input specifying the start date and time; and
outputting an open table notification.

18. The non-transitory computer readable medium of claim 14 further comprising instructions for:
receiving input from a third player specifying availability to join a game; and
outputting the input received from the third player.

19. The non-transitory computer readable medium of claim 14, wherein the second player is participating in a plurality of games at the coordinated event, further comprising closing another game in which the second player is participating at the coordinated event based upon the subsequent non-reply from the second player.

* * * * *